United States Patent
Duch et al.

(10) Patent No.: US 9,914,325 B2
(45) Date of Patent: Mar. 13, 2018

(54) SEALING DEVICE FOR A HUB BEARING ASSEMBLY

(71) Applicants: Daniele Duch, San Gillio (IT); Fausto Morello, Sommariva del Bosco (IT)

(72) Inventors: Daniele Duch, San Gillio (IT); Fausto Morello, Sommariva del Bosco (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/276,036

(22) Filed: Sep. 26, 2016

(65) Prior Publication Data

US 2017/0087934 A1   Mar. 30, 2017

(30) Foreign Application Priority Data

Sep. 29, 2015   (IT) .................. 102015000056435

(51) Int. Cl.
| | |
|---|---|
| *F16C 33/78* | (2006.01) |
| *F16C 33/76* | (2006.01) |
| *B60B 27/00* | (2006.01) |
| *F16C 41/00* | (2006.01) |

(Continued)

(52) U.S. Cl.
CPC ...... *B60B 27/0005* (2013.01); *B60B 27/0073* (2013.01); *F16C 19/186* (2013.01); *F16C 33/723* (2013.01); *F16C 33/763* (2013.01); *F16C 33/768* (2013.01); *F16C 33/782* (2013.01); *F16C 33/7806* (2013.01); *F16C 33/7869* (2013.01); *F16C 33/7873* (2013.01); *F16C 33/7886* (2013.01); *F16C 33/7896* (2013.01); *F16C 41/00* (2013.01);
(Continued)

(58) Field of Classification Search
CPC ... B60B 27/00; B60B 27/0073; F16C 19/185; F16C 19/186; F16C 33/723; F16C 33/763; F16C 33/768; F16C 33/7806; F16C 33/782; F16C 33/7873; F16C 33/7869; F16C 33/7886; F16C 33/7896; F16C 41/00; F16C 2233/00; F16C 2202/64
USPC ....... 384/448, 477, 489, 502, 504, 570, 586, 384/589; 29/898.04, 898.13
See application file for complete search history.

(56) References Cited

U.S. PATENT DOCUMENTS

| | | | | |
|---|---|---|---|---|
| 5,131,763 | A * | 7/1992 | Caron | F16C 19/185 |
| | | | | 310/168 |
| 2006/0274983 | A1* | 12/2006 | Takahashi | F16C 19/186 |
| | | | | 384/448 |
| 2009/0245935 | A1* | 10/2009 | Kamikawa | B60B 7/0013 |
| | | | | 403/359.1 |

FOREIGN PATENT DOCUMENTS

| | | |
|---|---|---|
| DE | 102006033931 A1 | 1/2008 |
| DE | 102012223881 A1 | 6/2014 |
| DE | 102013209522 B3 | 8/2014 |

(Continued)

*Primary Examiner* — Marcus Charles
(74) *Attorney, Agent, or Firm* — Bryan Peckjian; SKF USA Inc. Patent Dept.

(57) ABSTRACT

A sealing device for a hub bearing assembly, equipped with a rolling bearing unit, a circular metal shield, a radially extending end wall and a double cylindrical lateral wall fixed to and practically orthogonal to the end wall, formed by a first cylindrical lateral wall and a second cylindrical lateral wall. The metal shield is angularly coupled to a radially outer ring of the bearing. The second cylindrical lateral wall is connected in a fixed manner to a radially outer edge adapted to cover an axially inner surface of the terminal (Continued)

edge that is potentially subject to oxidation phenomena with the consequent formation of a layer of rust.

6 Claims, 2 Drawing Sheets

(51) Int. Cl.
*F16C 19/18* (2006.01)
*F16C 33/72* (2006.01)

(52) U.S. Cl.
CPC .......... *F16C 19/185* (2013.01); *F16C 41/007* (2013.01); *F16C 2233/00* (2013.01); *F16C 2326/02* (2013.01)

(56) References Cited

FOREIGN PATENT DOCUMENTS

| | | | | |
|---|---|---|---|---|
| DE | 102014205055 A1 | * | 9/2015 | .............. F16C 19/52 |
| DE | 102014206764 A1 | * | 10/2015 | .............. B60B 27/02 |
| DE | 102014208422 A1 | * | 11/2015 | ......... B60B 27/0073 |
| DE | 102014209022 A1 | * | 11/2015 | .............. B60B 27/00 |
| DE | 102015201798 A1 | * | 8/2016 | ......... B60B 27/0073 |
| EP | 1820985 A1 | * | 8/2007 | ............... B60B 3/16 |
| EP | 2990673 A1 | * | 3/2016 | ......... B60B 27/0068 |
| JP | H11174068 A | | 7/1999 | |
| JP | 2006112581 A | * | 4/2006 | ......... F16C 2326/02 |
| JP | 2008138720 A | * | 6/2008 | ......... F16C 2326/02 |
| JP | 2009250297 A | | 10/2009 | |
| JP | 2010180912 A | | 8/2010 | |
| JP | 2013011354 A | | 1/2013 | |
| WO | 2014026684 A1 | | 2/2014 | |
| WO | WO-2014187449 A1 | * | 11/2014 | ............ F16C 33/723 |

\* cited by examiner

Prior At

SEALING DEVICE FOR A HUB BEARING ASSEMBLY

CROSS REFERENCE TO RELATED APPLICATIONS

This application claims priority to Italian patent application no. 102015000056435 filed on Sep. 29, 2015, the contents of which are fully incorporated herein by reference.

FIELD OF THE INVENTION

The present invention relates to a sealing device for a hub bearing assembly. In particular, the present invention can be advantageously applied to the field of rolling-element bearings which have a device for reading the kinematic operating parameters, formed by a rotating phonic wheel and a fixed sensor facing the phonic wheel.

The present invention is particularly, but not exclusively, suitable for the field of hub bearing assemblies for a non-driving wheel of a motor vehicle. In these applications, the inner ring of the bearing is keyed on to the wheel axle and transmits the consequent rotary motion of this axle, while the outer ring of the bearing is keyed on to a fixed element, for example the strut of a suspension of the motor vehicle. The following description will refer to this specific application by way of example, without loss of generality.

BACKGROUND OF THE INVENTION

In the case of applications for non-driving wheels, that is to say wheels not having an axle passing through the axis of the bearing, the corresponding sealing devices have an axially symmetric "cup" shape so as to seal the void between the outer and inner rings of the bearing. The sealing device is made so as to be stably connected to the outer ring. Since the outer ring of the bearing is fixed, the devices form a static seal which protects the bearing from any environmental contaminant (water, mud, detritus, etc.).

Sealing devices for hub bearing assemblies are known from the prior art. For example, the document IT TO2014000689 describes a sealing device for a hub bearing assembly, provided with a metal shield, which has a lateral wall and a circular end wall fixed to the lateral wall. The metal shield is angularly coupled to a radially outer ring of the bearing. The sealing device is also provided with a sealant fluid, placed in an annular groove formed between a terminal edge of the radially outer ring and the cylindrical lateral wall of the shield. The cylindrical lateral wall can be placed in an intermediate position between a phonic wheel and a sensor for reading the angular velocity of the bearing.

In its generic configuration, the sealing device therefore provides a practically cup-shaped metal shield keyed on to a collar of the outer ring of the rolling bearing by a force fit with radial interference. Although, in preceding embodiments, the sealing device was designed to perform its function solely by means of the interference fit with the bearing, in current embodiments the sealing device has a metal shield to which is fixed either a sealing element of elastomeric material which is wrapped around the outside of the shield, or, as in the proposed example, a sealant fluid.

In the aforementioned example, the metal shield is force-fitted by interference along the radially inner surface of the collar of the outer ring. In an alternative solution, the shield, having larger radial dimensions, can be forced along the radially outer surface of the same collar of the outer ring.

The latter solution has the undoubted advantage of concealing the rust which forms on the axially inner annular surface of the collar. As is known, the rings of a rolling element bearing are made of special bearing steels which, although having high strength, are also subject to oxidation phenomena leading to rust formation if exposed to the air. Although this aspect need cause no concern regarding the strength of the bearing, being confined to an area not subject to mechanical stress, it is certainly unattractive to the end users of motor vehicles. Consequently, motor manufacturers, particularly those who produce prestige vehicles, specifically request that there should be no externally visible surfaces of the hub bearing assembly that can exhibit rust phenomena.

Unfortunately, all other things being equal, the solution of force-fitting a protective shield on to the outer surface of the outer ring provides poorer mechanical strength characteristics than solutions in which the shield is force-fitted along the inner surface. To simplify matters, we can say that the external force-fitting of a shield with an elastomeric element is equivalent to the internal force-fitting of a shield with no elastomeric element; moreover, an external force-fitting of a shield having no elastomer is completely impracticable in most cases.

Finally, the solution of force-fitting the protective shield on to the outer surface may be impossible to use because of constraints on overall dimensions imposed by the manufacturer's specific application.

Thus there is a need to devise a solution for the sealing device which will be capable of meeting the specifications of motor manufacturers in terms of rust concealment, while also providing mechanical strength and high reliability.

BRIEF SUMMARY OF THE INVENTION

The object of the present invention is to provide a hub bearing assembly which is equipped with a sealing device on its axially inner side, and which is free of the drawbacks described above. In particular, one aspect of the present invention is that of providing a solution which can conceal any rust present by masking the part of the bearing ring exposed to the air, while also having very good characteristics of mechanical strength and reliability. This is achieved according to the invention by providing a protective shield which is capable of being force-fitted along the axially inner surface of the collar of the outer ring, while also being provided with a radially outer edge covering the axially inner surface of the collar.

According to another object, the proposed solution simplifies the process of force-fitting the sealing device, since this solution does not require the use of any elastomeric element and yet provides better performance than a simple metal-to-metal seal, because the seal is enhanced by the action of a sealant applied to the axially inner surface of the bearing collar, or alternatively to the radially outer edge of the shield.

According to the present invention, a sealing device for a hub bearing assembly is described, having the characteristics stated in the appended independent claim.

Further preferred and/or particularly advantageous embodiments of the invention are described according to the characteristics stated in the appended dependent claims.

BRIEF DESCRIPTION OF THE SEVERAL VIEWS OF THE DRAWING

The invention will now be described with reference to the attached drawings, showing some non-limiting exemplary embodiments of the invention, in which.

DETAILED DESCRIPTION OF THE INVENTION

Figure 1:
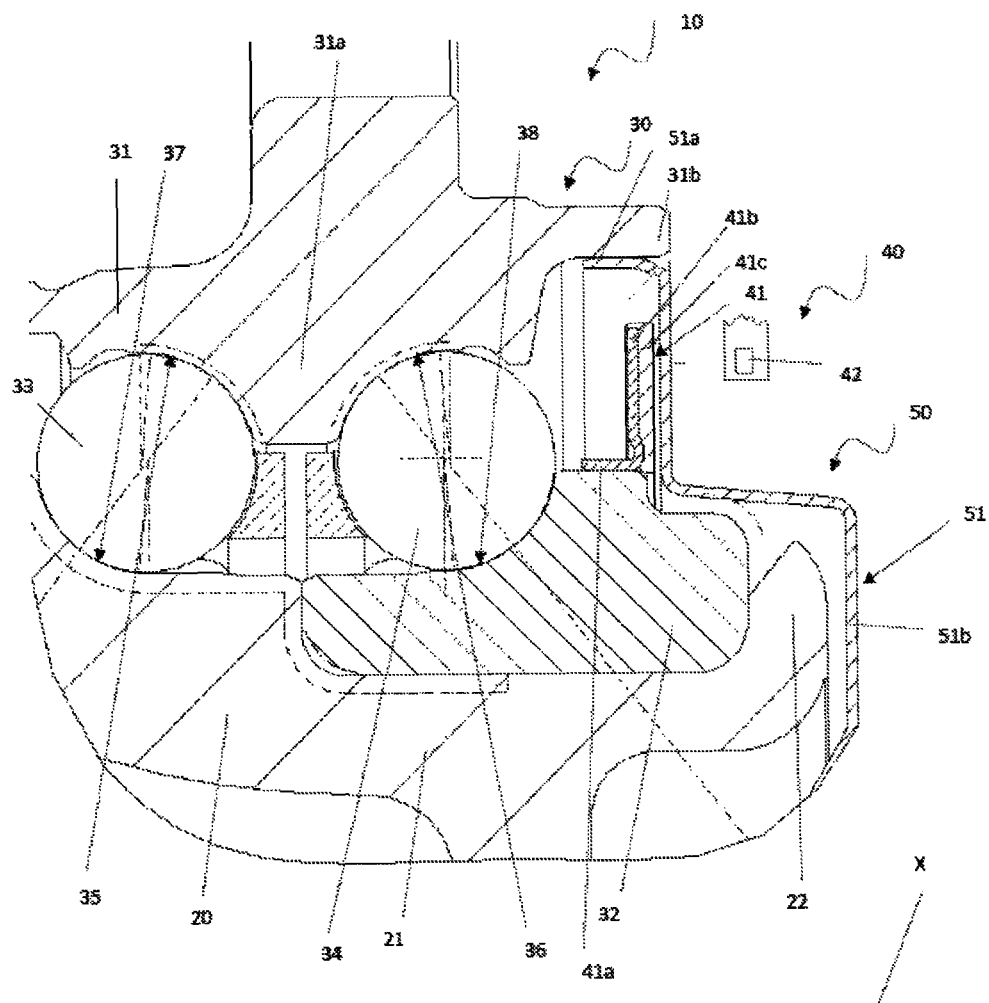
FIG. 1 is an axially symmetric cross section of a hub bearing assembly equipped with a sealing device according to the prior art.

With reference to FIG. 1, a hub bearing assembly is indicated as a whole by the number 10.

The assembly 10 provides a hub 20, rotatable and acting as a radially inner ring of the bearing, a bearing unit 30, a detection unit 40 for detecting the angular velocity of a wheel of a motor vehicle, and a sealing device 50 in an axially inner position. Throughout the present description and claims, any terms and expressions indicating positions and orientations such as "radial" and "axial" are to be interpreted as relating to the central axis of rotation X of the bearing unit 30. However, expressions such as "axially outer" and "axially inner" refer to the assembled condition, and in the present case preferably refer to a wheel side and to a side opposite the wheel side, respectively.

The bearing unit 30 provides a stationary radially outer ring 31, a rotatable radially inner ring 32, and a double ring of rolling bodies 33, 34, in this example balls, interposed between the outer ring 31 and the hub 20, and between the outer race 31 and the inner ring 32, respectively. To simplify the graphic representation, the references 33 and 34 can relate either to individual balls or to rings of balls; in particular, 33 indicates the axially outer ring of balls or individual ball, and 34 indicates the axially inner ring of balls or individual ball. Also for the sake of simplicity, the term "ball" is frequently used by way of example in the present description and in the appended drawings, rather than the more generic term "rolling bodies" (and the same reference numerals are also used). However, it should be understood that any other rolling bodies (such as rollers, tapered rollers, needle rollers, etc.) can be used in place of the balls.

The stationary outer ring 31 has an axially extending tubular main portion 31a, which defines in its interior the races 35 and 36 for the rings of rolling elements 33 and 34 respectively. The outer ring 31 also has an axially inner terminal edge 31b, on the radially inner lateral surface 31b' of which (see FIG. 2) the sealing device 50 is fitted, as described more fully below.

The rolling elements 33, 34 also rotate, respectively, on the hub 20 and on the radially inner ring 32, which is fitted on the hub 20. The hub 20 and the inner ring 32 form the races 37 and 38 for the rings of rolling elements 33 and 34 respectively.

The hub 20 has a central tubular portion 21 to which an axially inner rolled edge 22 is stably connected, this edge acting as an axial shoulder for the inner ring 32 and providing its axial pre-loading. Preferably, the rolled edge 22 is formed, after the inner ring 32 has been fitted, by cold plastic deformation, particularly by swaging or another similar operation.

The detection unit 40 for detecting the angular velocity of a wheel of a motor vehicle provides a phonic wheel 41 angularly coupled to the rotating ring of the bearing, in this case the radially inner ring 32, and a sensor 42, in this case a revolution sensor capable of acquiring a signal generated by the phonic wheel which can be used to monitor the kinematic operating parameters of the bearing, hub and wheel assembly. In particular, the phonic wheel 41 has a first cylindrical metal shield 41a, coupled to the inner ring 32, connected in a fixed way to a second shield 41b extending in a radial direction. An annular disc 41c of magnetized plastic or rubber is attached to this second shield 41b, by a suitable adhesive medium for example. The annular disc 41c is therefore also angularly fixed to the rotating ring of the bearing. An example of material used for the annular disc 41c is ferro-plastic, a versatile material composed of 90% barium or strontium ferrite, the remaining 10% being thermoplastic binders. Ferro-plastic is an inert material which may be isotropic or anisotropic and, depending on the end use, may be magnetized. It is also has a high degree of resistance to atmospheric agents because of its thermoplastic component. Plasto-ferrite is magnetized in various modes, including the multipolar mode.

Figure 2:
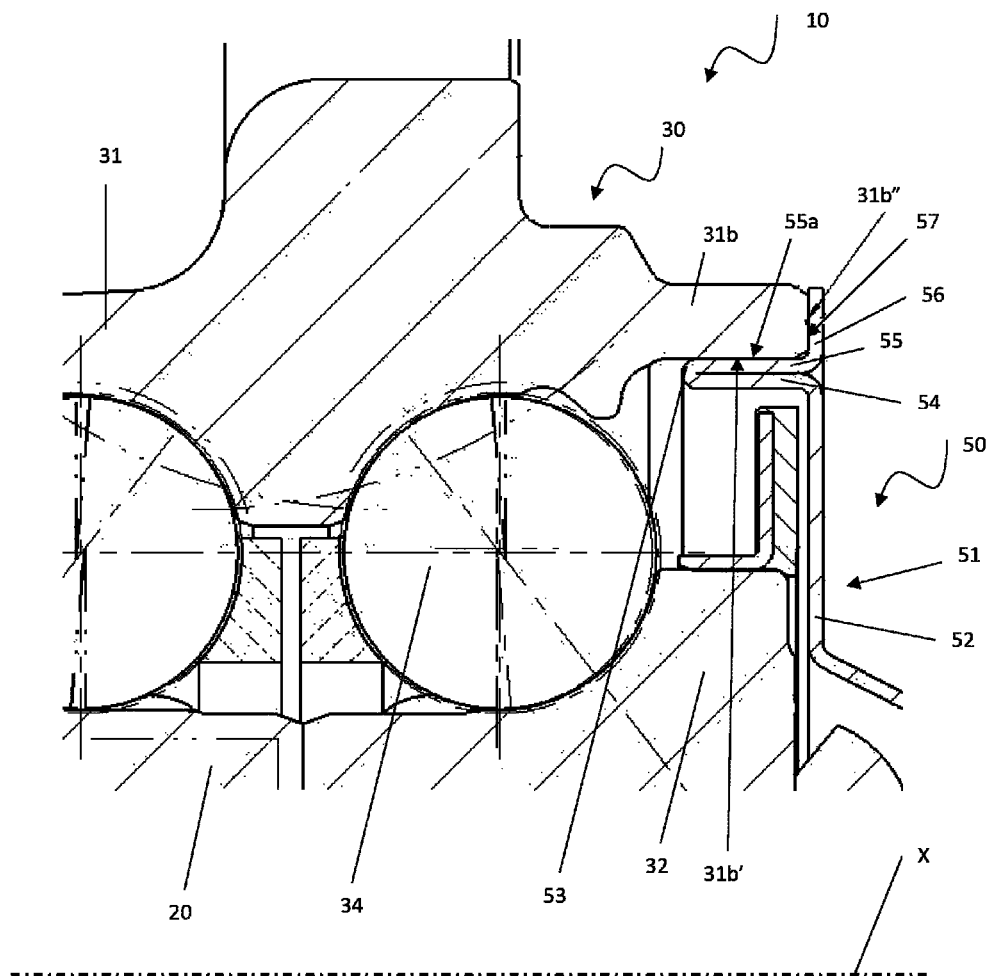
FIG. 2 is a detail on an enlarged scale of the axially symmetric cross section of the hub bearing assembly of FIG. 1, equipped with a sealing device according to a preferred embodiment of the invention.

With reference to FIG. 2, the sealing device 50, according to the present invention, provides a shield 51 which is keyed on to the outer ring 31 of the bearing 30 and is axially interposed between the phonic wheel 41 and the revolution sensor 42 (FIG. 1). The shield 51 is substantially cup-shaped and provides a circular, substantially radially extending end wall 52, and a double cylindrical lateral wall 53 which is fixed to and practically orthogonal to the end wall 52. The double cylindrical lateral wall 53 is formed by a pair of lateral walls 54, 55 which are fixed to one another and bent back fully on to one another through an angle substantially equal to 180°, and which are of substantially equal thickness. The first cylindrical lateral wall 54 is connected in a fixed way to the end wall 52 and is placed at an angle of substantially 90° to the end wall. The second cylindrical lateral wall 55 has a radially outer lateral surface 55a. This surface is the surface affected by the force-fitting of the shield on to the radially inner lateral surface 31b' of the axially inner terminal edge 31b of the outer ring 31. The second cylindrical lateral wall 55 is connected in a fixed way to a radially outer edge 56 and is placed at an angle of substantially 90° to this edge. The radially outer edge is the portion of the shield 51 adapted to cover an axially inner surface 31b" of the terminal edge 31b, in other words the surface of the outer ring 31 that may be subjected to oxidation phenomena and the consequent formation of a layer of rust.

Other things being equal, the particular configuration with a double cylindrical lateral wall 53 makes it possible to practically double the thickness of the wall of the shield subjected to force-fitting, thereby providing a more robust and reliable solution.

The sealing device further provides a sealant fluid 57, which is applied to the axially inner annular surface 31b" of the terminal edge 31b of the outer ring 31, or alternatively to the radially outer edge 56 of the shield 51. The main function of the adhesive is to contribute to the metal-to-metal seal between the radially outer edge 56 and the axially inner annular surface 31b", preventing the infiltration of water and contaminants and thereby reducing the risk of oxidation and rust formation along all the inner surfaces of the bearing rings.

The sealant fluid that is used may be a liquid adhesive characterized in that it cures in the absence of oxygen, or a varnish or other liquid or semi-liquid sealing substance, produced, purely by way of example, by one of the following technologies:

acrylic adhesives, for example cyanoacrylate-based adhesives, also known as "instant adhesives". These adhesives may optionally be formed by UV curing. Thus they combine the advantages of UV curing technology with the characteristics of instant adhesives;

polymer varnishes, for example an acrylic varnish containing a pigment in suspension in an acrylic polymer emulsion;

aerobic adhesive, which may optionally be filled with elastomers;

anaerobic adhesive.

The sealing device 50 is fitted on to the outer race 31 of the bearing in the following manner:

the sealant 57 is applied to the axially inner annular surface 31$b''$ of the terminal edge 31$b$ of the outer ring 31, or alternatively to the radially outer edge 56 of the shield 51;

force-fitting with radial interference (press-fitting) is performed between the diameters of the coupled surfaces, that is to say the radially inner lateral surface 31$b'$ of the terminal edge 31$b$ of the outer ring 31 and the lateral surface 55$a$ of the second cylindrical lateral wall 55 of the shield 51.

The chosen solution is easily applied, and is financially advantageous because the sealant fluid has a low purchase price, but above all it is highly competitive in terms of performance: for example, a mere 0.1 g of sealant fluid substantially improves the seal, by comparison with the seal obtained by metal-to-metal contact, and makes it equivalent to that obtained by using the elastomeric element.

Furthermore, because of the different embodiments described above, the process of assembling the device is not only faster because it does not require the operation of co-moulding the elastomeric element on to the metal shield, but is also simplified further by the flexibility offered by the adhesive fixing operation. This is because, depending on the configuration requirements of the device and the ease of application of the adhesive, this application may be carried out equally well on the terminal edge 31$b$ of the outer ring 31, rather than on the radially outer edge 56 of the shield 51.

It is to be understood that the liquid adhesive may be replaced with any other suitable sealant fluid which contributes to the realization of the same inventive concept.

In addition to the embodiments of the invention as described above, it is to be understood that there are numerous other variants. For example, in the described configuration the outer ring of the bearing and the sealing device are both stationary, but the invention is also applicable to the case of an outer ring and sealing device which are both rotatable. It is also to be understood that the embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, whether interpreted literally and/or according to their legal equivalents.

The invention claimed is:

1. A sealing device for a hub bearing assembly equipped with a rolling bearing unit, the sealing device comprising:
a circular metal shield keyed on to a radially outer ring of the rolling bearing unit and axially interposed between a phonic wheel and a revolution sensor of the hub bearing assembly;
a radially extending end wall;
a double cylindrical lateral wall fixed to and orthogonal to the radially extending end wall, the double cylindrical lateral wall being formed by a first cylindrical lateral wall and a second cylindrical lateral wall, the circular metal shield being angularly coupled to the radially outer ring of the rolling bearing unit by means of a stable contact between a radially inner lateral surface of an axially inner terminal edge of the radially outer ring and a lateral surface of the second cylindrical lateral wall,
wherein the second cylindrical lateral wall is connected in a fixed manner to a radially outer edge adapted to cover an axially inner surface of the axially inner terminal edge that is subject to oxidation phenomena and a consequent formation of a layer of rust; and
a sealant fluid adapted to be applied to one of the axially inner surface of the axially inner terminal edge of the outer ring and the radially outer edge of the shield.

2. The sealing device according to claim 1, wherein the first cylindrical lateral wall and the second cylindrical lateral wall are fixed to one another and bent back fully on to one another through an angle substantially equal to 180°.

3. The sealing device according to claim 2, wherein the first cylindrical lateral wall and the second cylindrical lateral wall have thicknesses that are substantially equal to one another.

4. The sealing device according to claim 1, wherein the sealant fluid is a liquid adhesive, a varnish or another liquid or semi-liquid sealant substance.

5. The sealing device according to claim 4, wherein the liquid adhesive is an adhesive that cures in the absence of oxygen.

6. A hub bearing assembly comprising:
a rotatable hub, and
a rolling bearing unit, having a stationary radially outer ring, a rotatable radially inner ring, and a double ring of rolling bodies, interposed between the stationary radially outer ring and the rotatable hub, and between the stationary radially outer ring and the rotatable radially inner ring, respectively, and
a detection unit for detecting an angular velocity of a wheel of a motor vehicle, having a phonic wheel and a sensor, and
an axially inner sealing device comprising:
a circular metal shield keyed on to the stationary radially outer ring of the rolling bearing unit and axially interposed between the phonic wheel and the sensor;
a radially extending end wall;
a double cylindrical lateral wall fixed to and orthogonal to the radially extending end wall, the double cylindrical lateral wall being formed by a first cylindrical lateral wall and a second cylindrical lateral wall, the circular metal shield being angularly coupled to the stationary radially outer ring of the rolling bearing unit by means of a stable contact between a radially inner lateral surface of an axially inner terminal edge of the stationary radially outer ring and a lateral surface of the second cylindrical lateral wall,
wherein the second cylindrical lateral wall is connected in a fixed manner to a radially outer edge adapted to cover an axially inner surface of the axially inner terminal edge that is subject to oxidation phenomena and a consequent formation of a layer of rust; and
a sealant fluid adapted to be applied to one of the axially inner surface of the axially inner terminal edge of the outer ring and the radially outer edge of the shield, and wherein the axially inner sealing device is angularly coupled to the stationary radially outer ring.

\* \* \* \* \*